Patented Jan. 8, 1952

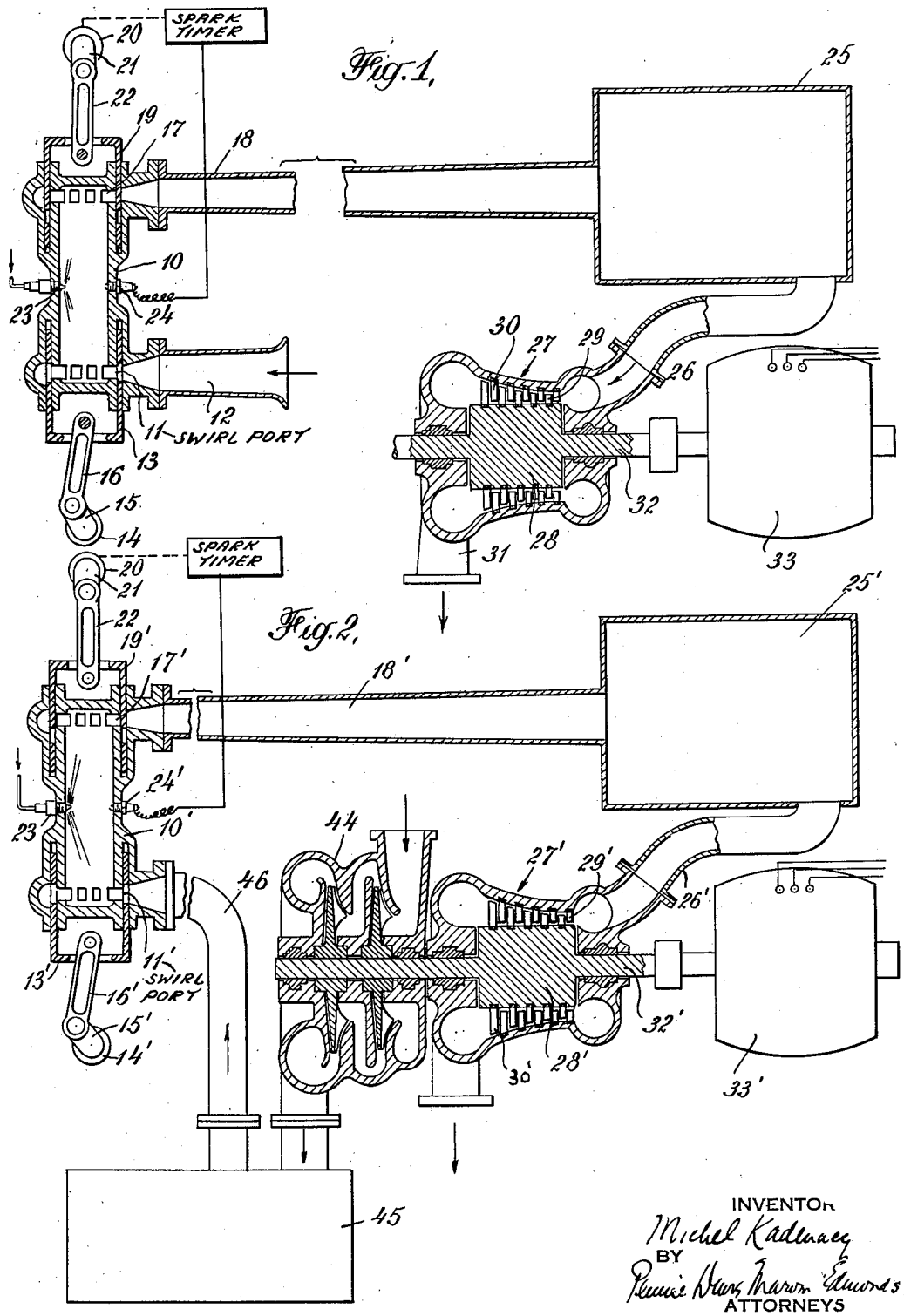

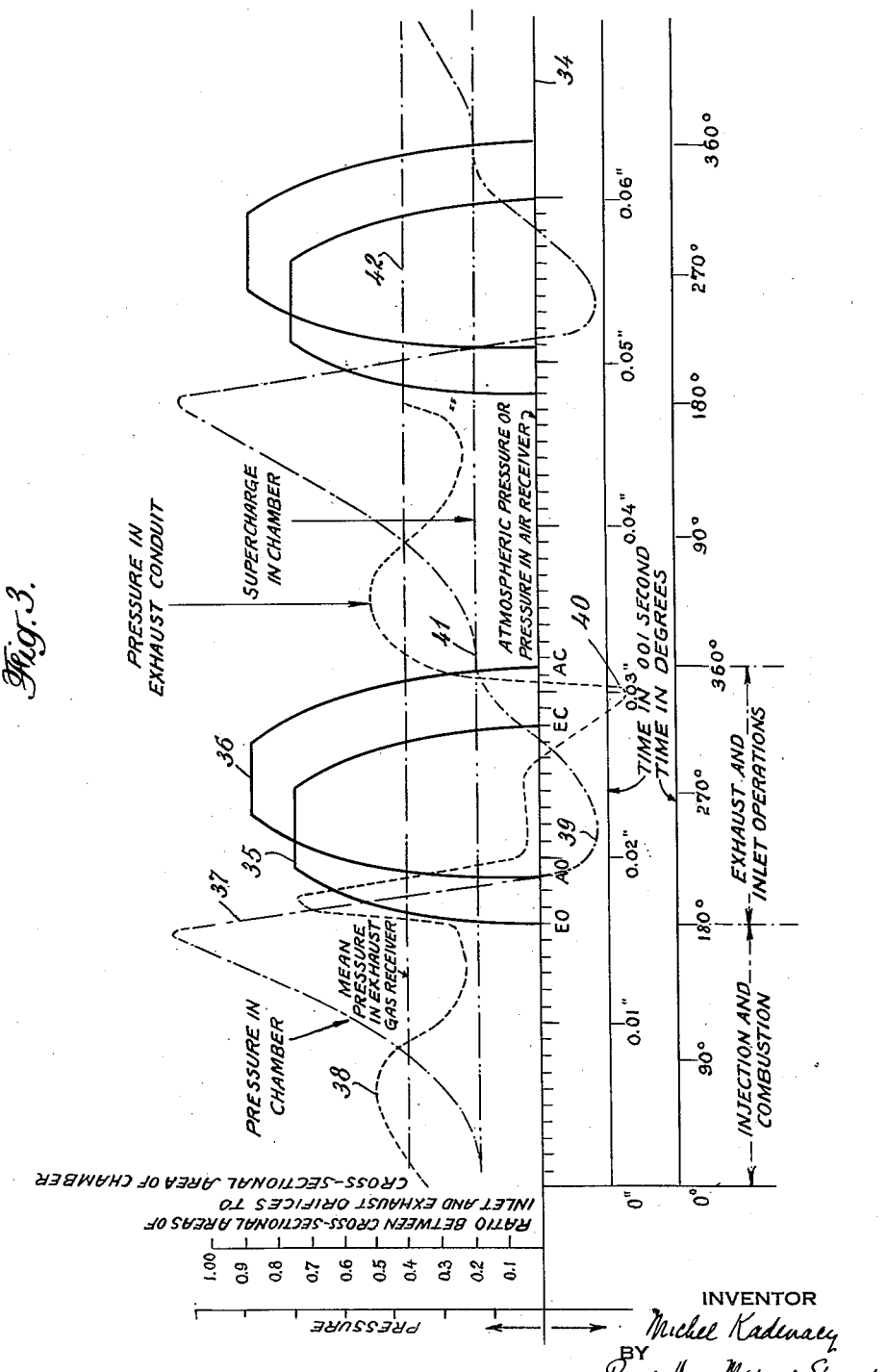

2,581,669

UNITED STATES PATENT OFFICE 2,581,669

GAS TURBINE POWER PLANT WITH TANK SUPPLIED BY LONG CONDUIT HAVING VOLUME OVER SIX TIMES THAT OF THE INTERMITTENT COMBUSTION GAS GENERATOR

Michel Kadenacy, Summit, N. J.; Nina K. Guercken executrix of said Michel Kadenacy, deceased Application April 13, 1945, Serial No. 588,189

8 Claims. (Cl. 60—13)

This invention relates to power generating apparatus, and more particularly to power plants which include a gas turbine of the kind known as the constant volume or explosion combustion type.

Constant volume gas turbines as heretofore constructed for use in power generating installations, have included a chamber with means for inlet and exhaust, in which a combustion mixture may be burned, the exhaust port of the chamber being connected through a conduit to a turbine adapted to be operated by the expanding exhaust gases. In the operation of such systems, the burned or exhaust gases expand from the combustion chamber and through the exhaust gas conduit and turbine as well as in the outlet from the turbine. Accordingly, during the periods when the exhaust gases are driving the turbine wheel, the pressure of the gases in the system is greatest in the combustion chamber and decreases gradually through the exhaust system including the turbine. The procedure gradient of the exhaust gases decreases in the same direction at all times throughout the operation of such an installation, even during the inlet period when a fresh charge is being introduced into the combustion chamber, and the highest gas pressure always exists in the combustion chamber.

As a result of the conditions described, the combustion chamber remains filled with burned gases at super-atmospheric pressure at the end of each cycle of operation, so that a fresh charge of air or combustible mixture cannot be introduced into the chamber at atmospheric pressure, and a blower or other form of compressor must be used to scavenge the chamber and charge it. In such an installation, a substantial amount of work is thus unprofitably expended by the blower or compressor, and the efficiency of the plant is thereby materially reduced. The efficiency is further impaired because of the mixing of the fresh gases or charge with the burned gases during the expulsion of the latter, since such mixing lowers the quality of the charge and hence reduces its ability to produce power.

The present invention is, accordingly, directed to the provision of a power plant which is not subject to the disadvantages and difficulties inherent in prior similar apparatus, as above set forth.

The novel power generating plant of the invention, in its preferred form, comprises a combustion chamber or cylinder having inlet and exhaust ports and control means therefor so constructed and operated that the exhaust and inlet of the gases will occur in accordance with the phenomena of explosion and implosion, respectively, and the masses of gases during such explosive exhaust and implosive inlet will acquire a large, and preferably, a maximum quantity, of dynamic or kinetic energy. In order to obtain such explosive exhaust, the exhaust port opening must have a cross-sectional area bearing a particular relation to the cross-sectional area of the combustion chamber, and the port must be opened within a definite time interval. These conditions are fulfilled in the new installation, and as a result, the burned gases leave the chamber through the port in a mass at high velocity. As the mass of escaping exhaust gases loses contact with the walls of the chamber, a void is created in the chamber behind the moving mass of gases and in the vicinity of the inlet port. The inlet port is opened to such extent and in such time interval at or immediately after the creation of the void within the chamber, that the fresh gases enter the chamber through the inlet implosively and at high velocity in a mass. The inlet port is then maintained open until the chamber is fully charged.

In the charging of the chamber in accordance with the phenomenon of implosion as described, the fresh gases or combustible mixture outside of the chamber virtually explode through the inlet port and fill the void in the interior of the chamber implosively. Since the fresh gases enter the chamber behind the exhaust gases while the latter are moving bodily at high velocity toward or through the exhaust port, the momentum of the exhaust gases is such as to prevent any action thereby on the incoming charge, and the exhaust gases in no way interfere with the introduction of fresh gases or impair the quality thereof. When the chamber is charged with air, a portion of the incoming air is permitted to pass through the combustion chamber and into the exhaust conduit where such incoming air is stored with the exhaust gases, which are subsequently employed for operating the turbine. The fresh air so passing through the combustion chamber and into the conduit serves to cool both the chamber and the stored gases and also to fill the potential void in the conduit behind each exhaust gas mass traveling away from the chamber through the conduit.

By virtue of the self-cleaning of the combustion chamber as a consequence of the explosive discharge of the exhaust gases, followed by the implosive inlet of the fresh charge, a combustion chamber constructed and operated in the manner described may be indefinitely operated at high efficiency. Such a combustion chamber may be adequately recharged by natural inlet from the atmosphere without the necessity of employing a blower or other compressing apparatus and thus the power required in prior installations to operate the blower is saved and the efficiency of the new installation is correspondingly increased.

In the new power plant, the exhaust port of the combustion chamber is connected to a suitable apparatus adapted for operation by expanding gases, such as a turbine, by means including an exhaust conduit, and, preferably, also including a receiver to which the exhaust conduit leads. The conduit and receiver contain exhaust gases under super-atmospheric pressure, which pass through the turbine and do work therein on their way to the atmosphere. The exhaust conduit is of such cross-sectional area, length, and form that, as the body of exhaust gases escaping explosively in a mass through the exhaust port enter the conduit, the forward movement of the mass of gases is resisted only by the inert gases within the conduit. The mass of exhaust gases moves through the conduit, propelling the inert gases ahead of it, and such action continues until the moving exhaust and inert gases lose their dynamic energy and create a pressure front. From this front, the gases rebound toward the exhaust port, but they are trapped within the conduit by the closing of that port. The energy in the trapped gases is then utilized in the turbine as above explained.

In accordance with the phenomenon of explosive exhaust, the burned gases, upon the opening of the exhaust orifice, will react against the walls of the combustion chamber during the period of acceleration of the mass of the exhaust gases out of the combustion chamber. When these gases have gained sufficient speed, they cease to react against the walls of the chamber but continue their movement out of and away from the chamber by virtue of the inertia of their mass. By closing the exhaust orifices before the exhaust gases return to the combustion chamber after rebounding from the pressure front created by the ballistic movement of the exhaust gas mass out of and away from the chamber and by maintaining the exhaust orifices closed until the beginning of the explosive exhaust of the next cycle of operation, the internal walls of the combustion chamber are kept from serving as a reaction surface for the gases, when they exert a working force upon the turbine wheeel.

In order to produce satisfactory explosive exhaust whereby the combustion chamber is completely freed of exhaust or burned gases and whereby the gases are projected out of the chamber as a mass by the momentum thereof, the area of the exhaust orifice must be suitably proportioned in accordance with the disclosures of my Patents Nos. 2,102,559, 2,123,569, 2,144,065 2,130,721, and 2,131,959. Reference is also had to my U. S. Patents Nos. 2,167,303, 2,131,957, 2,198,730, 2,168,528, 2,147,200, 2,134,920, 2,110,986, and 2,206,193 which relate to the movement of exhaust gases from a combustion chamber. The patents disclose that for explosive discharge or exhaust of the gases, the area of the exhaust orifice may, in some instances, be as little as or even somewhat less than one quarter of the transverse cross-sectional area of the combustion chamber. The patents also disclose that maximum effective area for the exhaust orifice is equal to the entire transverse cross-sectional area of the combustion chamber, but opening the orifice to one-half or more of this entire area has been found to give practically satisfactory results.

The time required for opening the exhaust orifice to the extent necessary is another determining factor in obtaining effective explosive exhaust. When the exhaust gases are accelerated and, hence, acquire their dynamic energy in the combustion chamber within $1/150$ of a second, the ballistic effect or momentum of the gases is sufficient to produce self-cleaning, that is, the removal of all burned gases from the combustion chamber, and is sufficient also to insure satisfactory implosive inlet under atmospheric pressure and without the assistance of a blower or its equivalent. In a practical installation, satisfactory self-cleaning of the combustion chamber and effective implosive inlet are obtained, if the mass of burned gases is accelerated and begins to move solely by virtue of its inertia within $1/300$ of a second, as recommended in the patents above mentioned. A shorter acceleration interval, such as $1/450$ of a second, for example, will intensify the ballistic effect or momentum of the burned gases. Perfect functioning of the explosive exhaust process will occur in a properly designed combustion chamber when the opening of an exhaust orifice having a cross-sectional area about one-half the transverse cross-sectional area of the chamber is effected within the shorter time intervals mentioned. Since the phenomenon of implosive inlet is similar in nature to the phenomenon of explosive exhaust, the inlet orifice should be opened to an extent and within a time interval of approximately the same orders of magnitude as are mentioned above in connection with the exhaust port.

For most efficient operation, the inlet ports or orifices of the combustion chamber may be designed to produce a swirling movement or other form of turbulence of the fresh charge inside the combustion chamber. Such turbulence will tend to effect more rapid and more complete burning of the charge inside the chamber before the exhaust orifice begins to open. The combustible component of the charge may be solid, liquid, or gaseous and may be introduced into the combustion chamber during the closing of the inlet orifice, or, if desired, it may be introduced at any other suitable time by any other suitable means, either with or independently of the charge of fresh air. The firing of the combustible charge may be effected by means of a spark or in any other known manner.

Although, as pointed out above, a fresh charge may be supplied to the combustion chamber of the new installation under atmospheric pressure and directly from the atmosphere during each cycle of operation, the new charges may also be furnished by a blower, compressor, or the like, either directly or indirectly by way of a compressed air reservoir. When the inlet air or combustible mixture is supplied under pressure, the entire installation, including the combustion chamber, the exhaust gas conduit and receiver, and the turbine, may operate at a correspondingly higher pressure level than when the inlet air is supplied at atmospheric pressure. Under such conditions, the relative zero of the gas pressure curve throughout the entire power plant is the absolute pressure of the gases at the source or inlet supply. However, the gas pressure level at which the system is operated does not in any way affect the operation of the combustion chamber in accordance with the phenomena of explosive exhaust and implosive inlet.

Satisfactory operation of the new installation may be obtained by introducing fresh air from the atmosphere at atmospheric pressure into the combustion chamber, but the power output of the installation may be increased by connecting the inlet of the combustion chamber to a blower or other suitable source of compressed air. In this case, it is recommended that an inlet system of the character disclosed in my Patent No. 2,281,585 be used. The use of the patented inlet system makes it possible to develop within the combustion chamber a pressure in excess of the pressure of the inlet supply and, thus, with that inlet system, the work to be done by the blower to produce a desired final pressure in the chamber is considerably less than that required of a blower producing the same pressure in a conventional installation.

In the new installation, the implosive inlet process and the closing of the exhaust port by mechanical means take place in the time interval during which the mass of exhaust gases travels outwardly through the exhaust gas conduit to the point of creation of the pressure front and the mass rebounds from the front and travels backwardly to the chamber. The conduit connected to the exhaust orifice of the combustion chamber must, accordingly, be so designed and constructed that there will be a sufficiently long time interval available for the purposes mentioned. The time interval is dependent upon the distance which the exhaust gases must travel away from and back to the combustion chamber and that distance is dependent to a large degree upon the resistance per unit of travel of the exhaust gas mass offered by the mass of inert gases in the exhaust gas conduit to the acceleration, compression, and displacement of said mass by the exhaust gas mass. The dynamic energy of the latter is expended in thus acting upon the inert gases. Accordingly, the exhaust gas conduit must be relatively long with a relatively small internal volume containing inert gases and yet be of such a nature as to provide a substantially "free passage" for exhaust gas masses, that is, a passage through which such masses may travel without unnecessary friction between the moving gas masses and the walls of the conduit and which contains inert gases offering minimum resistance to the moving exhaust gas masses per unit of travel thereof.

In order that the conduit may provide such a free passage, the smallest cross-sectional area of the conduit taken transversely of the direction of movement of the gases should be substantially equal to the area of the exhaust orifice that is open at the moment that the burned gases cease reacting against the walls of the combustion chamber and start to move out of and away from the chamber as a mass. The cross-sectional area of the conduit, preferably, increases slightly and progressively, or step by step, toward the exhaust gas receiver or turbine. For example, the conduit may be a conicity of from 1% to 10% or the equivalent thereof for each increment of its length, that is, the radius of a cylindrical conduit may be increased an amount between these percentages for each such increment of length. The best shape for the conduit will depend somewhat on the size and characteristics of the combustion chamber but, as an example, the cross-sectional area of the conduit at its outer end may be approximately double the area at its inner end. The conduit may also be partially of constant cross-sectional area, for example, cylindrical and partially of increasing cross-sectional area, for example, conical.

The volume of inert gases in an exhaust conduit of the free passage form, which can be displaced by a mass of exhaust gases leaving the combustion chamber under its own momentum in explosive exhaust, may be six to twelve or more times the volume of the combustion chamber. The volume of inert gases actually displaced in any specific case will depend somewhat upon the mass or density of such gases and upon the quantity of dynamic energy acquired by the explosively exhausted gas mass. As such dynamic energy is derived from the energy liberated by the burning of the combustible mixture, which resulted in the production of the exhaust gases, it will be apparent that the quantity of inert gases displaceable by an explosively exhausted gas mass will depend on the amount of fuel burned.

When a full charge of combustible mixture is burned in the combustion chamber, the exhaust gas mass produced by explosive exhaust of the burned gases will have such dynamic energy that it will displace a volume of inert gases in a free passage exhaust conduit, which may be, for example, twelve or more times the volume of the combustion chamber. As the static pressure front develops, when all the dynamic energy in an exhaust gas mass has been utilized to displace and compress inert gases, and since compressed inert gas is to be displaced from the conduit into the receiver, the exhaust gas conduit should be of the cross-sectional shape previously described and it should be of such length as to contain a little less than the maximum amount of inert gases displaceable by an exhaust gas mass. If the conduit has a less volume, each exhaust gas mass will travel through it and pass well into the receiver, which, as illustrated, is of substantially greater cross-section than the end of the conduit connected thereto. Within such a receiver, the exhaust gas mass will at once encounter greater resistance to travel than in the conduit, so that the static pressure front will be more quickly formed. Accordingly, for maximum outward travel of the exhaust gas masses and maximum time interval between the departure of the gases from the chamber and their return, the length of the conduit should be such as to contain the maximum amount of inert gases displaceable by an exhaust gas mass. However, since a receiver is required and it is desired to effect displacement of the inert gases from the conduit into the receiver, the conduit should be made of such length that the pressure front will be formed within the receiver just beyond the end of the conduit. This will reduce the time interval slightly but, ordinarily, not enough to cause interference with inlet.

While the volume of the exhaust gas conduit may vary in different installations, the exhaust gases should alway rebound from a gaseous pressure front and the exhaust gas masses and the compressed inert gases, which ultimately make up the pressure front, should not strike and rebound from a solid wall, such as the wall of the receiver or the turbine. If such rebound occurs, the interval, during which the inlet process and the closure of the exhaust orifice take place, will be shortened. If the gases moving outwardly are not intercepted by a wall and the pressure front develops, a reversal in the direction of movement of the gases will not take place as soon, will not be as sharp, and the velocity of the gases in their return movement will not be as great as would be the case if the gases should strike and rebound from a wall. If the exhaust gas conduit is designed to provide the required time interval for inlet under full power conditions, the time will be sufficiently long for inlet under all conditions of operation.

Preferably, in order to produce a damping effect upon the oscillations of the stored gas which result from the hammering of the intermittent explosive exhausts, the combined volume of the exhaust gas conduit and receiver may be considerably larger than is necessary for insuring a sufficiently long interval for the inlet processes. By thus providing a larger volume and, hence, a greater mass of inert gases between the combustion chamber and the turbine wheel, the gases within that volume between the turbine wheel and the rebounding front heretofore described will assume a steadier or less turbulent condition and this will facilitate the discharge and smooth out the flow of the gases into the turbine. In practice, therefore, it will be desirable to provide an exhaust gas receiver or similar enclosed space having a volume as much as twenty to forty or more times greater than the volume of the combustion chamber and to connect the turbine to the receiver at a point which is more distant from the combustion chamber than the place at which the rebounding pressure front is located.

The gases stored or trapped under static pressure within the exhaust gas receiver are expanded through the turbine or other similar device to impart rotary movement to the turbine wheel in a manner well understood in the art and the wheel may be connected to a dynamo, or similar device, for utilizing the energy possessed by the expanding gases. If desired, the turbine wheel may also be connected to a blower or similar device which is utilized for supplying air under pressure to the combustion chamber.

For a better understanding of the invention, reference may be made to the accompanying drawings, in which Fig. 1 is a diagrammatic view, mostly in section and with parts broken away, illustrating one form of a gas turbine power plant which embodies the present invention;

Fig. 2 is a similar view illustrating a modified form of power plant wherein the inlet air is supplied by a blower through an air receiver; and Fig. 3 is a graph which illustrates the mode of operation of typical installations of the structures illustrated in Figs. 1 and 2.

In the embodiment of the invention shown in Fig. 1 by way of example only, the novel power plant comprises a combustion chamber 10 in the form of an elongated cylinder, the length of which is several times greater than the diameter. Fresh air or a combustible mixture is supplied to cylinder 10 from the atmosphere at atmospheric pressure through an air conduit 12 and one or more inlet ports or orifices 11 in the wall of the cylinder adjacent one end thereof. Such ports are preferably shaped in a known manner to impart a swirling motion to the incoming air or charge and the total area of the ports is preferably greater than one-half the transverse cross-sectional area of cylinder 10. The exhaust gases are discharged from the cylinder or combustion chamber 10 through one or more exhaust ports or orifices 17 adjacent the other end of the cylinder, the total area of the exhaust ports being approximately the same as or greater than the area of inlet ports 11. Air conduit 12 is preferably designed in accordance with the teaching of my Patent No. 2,281,585, to assist in producing a supercharging of the combustion chamber.

The opening and closing of ports 11 may be controlled by any suitable means, such as a sleeve valve 13, which may, in turn, be actuated in any suitable manner, as by means of a driven shaft 14 having a crank 15 connected with the valve by a connecting rod 16. Exhaust ports 17 may be controlled by a similar sleeve valve 19 operatively connected by a connecting rod 22 to the crank 21 of a driven shaft 20. It will be understood that ports 11 and 17 may be controlled by various other types of valves or mechanisms, such as poppet valves, piston valves, and the like. The shafts 14 and 20 for operating the valves for controlling the inlet and exhaust ports may be driven in proper timed relation from any suitable source of power.

In the construction shown, the chamber is charged with air and the means for supplying the combustible to cylinder 10 comprises a liquid fuel injection nozzle 23 or other suitable injection device, which may be mounted in the wall of the cylinder and may be of any suitable known construction. The ignition of the combustible mixture within chamber 10 may be effected by a spark plug 24 or other suitable device. Suitable control means of any known construction may be provided for controlling the injection of fuel and the occurrence of a spark across the electrodes of spark plug 24, so that injection and ignition will occur in suitable timed relation to each other and in proper timed relation to the operation of the control means for the inlet and exhaust ports.

In order to render it possible to utilize to the best advantage the energy developed by the burning of the charge within combustion chamber 10, means are provided for trapping the burned or exhaust gases under static pressure within a space outside the combustion chamber. Such means, as shown, comprise a tubular exhaust gas conduit 18 connected to cylinder 10 in such manner that burned gases will pass from the cylinder into the conduit when valve 19 is actuated to open exhaust ports 17. When the exhaust ports are opened to a sufficient extent in a sufficiently short time, as above explained, the burned gases will be projected from the cylinder into conduit 18 in a mass in accordance with the phenomenon of explosive exhaust. Likewise, when the inlet ports 11 are opened in a like manner in properly timed relation with the beginning of the mass movement of the exhaust gases, the inlet of fresh air will take place in accordance with the phenomenon of implosion.

For reasons above given, the transverse cross-sectional area of conduit 18 at its connection with cylinder 10 is substantially equal to the total area of exhaust ports 17, that is, to the sum of the area of the ports that have been opened or uncovered by valve 19 at the instant that the burned gases start to move as a mass by virtue of their momentum, in accordance with the phenomenon of explosive exhaust. The exhaust gas conduit, is illustrated, has smooth internal walls and it tapers gradually throughout its length and has its largest cross-sectional area at the end remote from cylinder 10. Generally speaking, the internal volume of conduit 18 should be approximately six to twelve or more times greater than the volume of cylinder 10, the ideal volume of the conduit being such that it contains approximately the maximum amount, or preferably a little less, of inert gases displaceable by an exhaust gas mass. Use of a conduit described will insure that the pressure front will not be formed too quickly and will prevent exhaust gases rebounding from the pressure front from interfering with the inlet process.

The enlarged end of exhaust gas conduit 18 is shown as being directly connected to an exhaust gas receiver 25, which is in turn connected through a tube 26 with the input side of a gas turbine 27 or the like having an exhaust pipe 31. Although receiver 25 is illustrated as being cylindrical and, hence, rectangular in longitudinal cross-section, it may have any of many suitable shapes and may in fact be an integral part of the casing of turbine 27. The receiver 25 illustrated merely typifies an enclosed space between the outer end of exhaust gas conduit 18 and the rotor 28 of the turbine 27. In order to effect a damping of the oscillations of the stored gases and, hence, smooth out the operation of the turbine, the volume of receiver 25 should be many times greater than the volume of combustion chamber 10. Preferably, conduit 26 is connected to receiver 25 at a point remote from the discharge end of conduit 18 and, hence, as far as possible beyond the gaseous pressure front which results from the explosive exhaust.

The turbine 27 is diagrammatically illustrated as embodying a turbine rotor 28 which carries a plurality of rows of buckets 29 that extend between rows of stator blades 30 mounted on the wall of the turbine casing. Gases which expand through the turbine from exhaust gas receiver 25 escape from the turbine casing through pipe 31. The turbine rotor is mounted on a shaft 32, supported for rotation in suitable bearings in the turbine casing, and the shaft may be coupled to a dynamo 33 or other suitable device. Since the turbine, per se, does not form a part of the present invention, it is believed to be unnecessary to illustrate and describe it in more detail. The gases stored in receiver 25, conduit 26, and the enclosed space in the turbine casing ahead of the turbine rotor act upon the latter by their expansion and, hence, the turbine may be of either the impulse or reaction types and may also be of either the high speed or low speed types.

The inlet and exhaust orifices 11 and 17 are so designed and controlled that the areas thereof, when the orifices are opened, and the duration of their opening time all serve to produce the explosive exhaust, which cleans the combustion chamber of the burned gases, and the implosive inlet, which fills and supercharges the combustion chamber with a new and fresh charge of air or suitable combustible mixture.

The operation of the new power plant is as follows: When the plant is to be started, the means for operating the valves, the fuel pump, and the usual spark timer are started and, after each injection of fuel, the combustible mixture in the chamber is ignited while the inlet and exhaust orifices are closed. The exhaust orifice is then opened to such an extent and in so brief an interval, that the exhaust of the gases is in accordance with the phenomenon of explosive exhaust. For this purpose, as previously explained, the valve 19 is operated, for example, in .0025 second to open a total orifice area equal to one-half the transverse cross-sectional area of the chamber. During the short interval, the entire mass of gases within the chamber as well as part of the mass of inert gases inside the exhaust gas conduit 18 are accelerated. All the burned gases within the combustion chamber then start to move out of the chamber as a mass by virtue of the inertia thereof, and, hence, cease to react against and lose contact with the walls of the chamber in the vicinity of inlet ports 11. At the instant that this mass movement of the burned gases begins, inlet orifices 11 are opened by actuation of valve 13 in such manner that an implosion of atmospheric air into chamber 10 through pipe 12 and ports 11 occurs. Because of their explosive discharge from the combustion chamber, the exhaust gases travel as a mass with ballistic speed into and through exhaust gas conduit 18, compressing the inert gases in their path and immediately in front thereof and, simultaneously with this movement of the exhaust gas mass, fresh gases enter and pass through the combustion chamber and into the exhaust gas conduit behind the exhaust gas mass.

When the dynamic energy of the moving exhaust gas mass has been spent in overcoming the inertia of the part of the inert gases in the path of the mass within conduit 18 and exhaust gas receiver 25, the mass of exhaust gases and the mass of inert gases compressed thereby form a gaseous pressure front inside conduit 18 or receiver 25 adjacent the end of conduit 18, depending upon the intensity of the explosion of the charge in chamber 10 and the intensity of the resulting explosive exhaust, which determine the amount of dynamic energy possessed by the moving exhaust gas mass. The outward movement of the exhaust gas mass will, by way of example, be reversed by the explosion of the pressure front in approximately .005 to .006 of a second after the exhaust orifice begins to open in a suitably designed power plant, provided the pressure front does not come into rebounding contact with a wall or the turbine rotor. From the place at which the pressure front is formed, the exhaust gas mass rebounds and moves back toward the combustion chamber 10, but before the rebounding mass reaches the combustion chamber, exhaust ports 17 are closed by valve 19, thereby trapping the exhaust gases and, preferably, a part of the inlet gases within conduit 18 and receiver 25.

Upon the closing of exhaust ports 17, the high speed movement of the incoming mass of fresh gases through the combustion chamber under the implosive process will be suddenly stopped, thereby producing a shock and a rise of pressure inside of the combustion chamber, as more fully set out in my Patent No. 2,281,585. Although the movement of the mass of fresh gases through the combustion chamber is stopped by the closing of the exhaust ports, the pressure inside the chamber is built up by virtue of the momentum of the rapidly moving mass of incoming gases, during the time that the charging of the chamber is continuing. Before any substantial portion of the incoming gaseous charge rebounds out of the combustion chamber, inlet orifices 11 are closed by actuation of valve 13, thereby trapping the charge within chamber 10 at a pressure of from 1.5 to 1.8 atmospheres absolute, as explained in the patent identified. The combustible is then injected through nozzle 23 and is thereafter ignited by a spark across the terminals of sparking device 24. This completes one cycle of operation of the combustion chamber.

The pressure of the gases stored in conduit 18 and the enclosed space between the end of the conduit and the turbine wheel, i. e., the space within receiver 25, conduit 26, and the inlet end of the casing of turbine 27, is increased by the successive explosive exhausts from combustion chamber 10 and the final pressure which these stored gases may attain, is partly determined by the resistance that the gases encounter in escaping from the enclosed space through the turbine 27. The expansion of the stored gases through the turbine causes rotation of turbine wheel 28, and hence, of shaft 32, which may be connected to drive any suitable device, such as dynamo 33.

The operation of a typical power plant constructed and operated in accordance with this invention is graphically illustrated in Fig. 3 of the drawings. In this figure, the ordinates represent gaseous pressures with respect to some of the curves, while with respect to others, the ordinates represent the areas of the exhaust and inlet ports opened by the exhaust and inlet valves or other control means, expressed in terms of the ratios between the opened areas and the transverse cross-sectional area of the combustion chamber. The abscissae represent time expressed in terms of thousandths of a second or in terms of the degrees of rotation of the mechanical devices, such as cranks 14, 15, and 20, 21, which control the opening and closing of the exhaust and inlet orifices. The base line 34 represents the pressure of the inlet air or combustible mixture at the source of supply thereof, such pressure being atmospheric in the case of the installation shown in Fig. 1, wherein the fresh gaseous charge is supplied from the atmosphere directly.

The curve 35 is a time-area diagram illustrating the area of opening and the times of opening and closing of exhaust orifices 17, and curve 36 is a similar diagram, illustrating the area of opening and the times of opening and closing of inlet orifices 11. The instant at which the exhaust ports start to open is indicated at EO and the instant at which the ports are completely closed is indicated at EC. The beginning of the opening of the inlet ports is indicated at AO and the instant at which those ports are completely closed is indicated at AC. The curve 37 is a time-pressure curve, which represents the apparent gaseous pressures within the combustion chamber during a complete cycle of operation, and the time-pressure curve 38 is indicative of the apparent gaseous pressures in exhaust conduit 18 at a point adjacent the connection thereof to combustion chamber 10, i. e., close to the exhaust orifices 17. Curves 37 and 38, accordingly, show the pressure conditions during the explosive exhaust and implosive inlet processes at the respective positions at which the pressure measurements are taken. The gaseous pressure at the positions mentioned may be determined in any known manner, such as by the use of a cathode ray oscillograph.

As indicated by the curves of Fig. 3, exhaust port 17 begins to open at approximately the time that the gaseous pressure within combustion chamber 10 reaches its maximum or peak value as a result of the explosion or burning of the combustible charge. With the opening of the exhaust orifice, there is a shock and a sharp pressure impulse at the assumed point of measurement in conduit 18, but the apparent pressure at this point levels off slightly above the base or relative zero pressure line 34 as and after the ballistically projected exhaust gas mass passes the point, thus indicating the arrival of inlet gases behind the mass as it moves out of and away from the combustion chamber. After closure of the exhaust port, the rebounding exhaust gases reach a position close to the combustion chamber and, after some oscillation, cause a rise of pressure in conduit 18 to approximately the mean static pressure of the inert gases in the conduit and receiver 25.

The point at which curve 37 crosses line 34 indicates the instant that the burned gases lose contact with the walls of chamber 10 adjacent the inlet port and begin to move as a mass by virtue of inertia, thereby tending to create a void in the chamber in the vicinity of inlet ports 11. At this instant, the inlet ports begin to open and permit the phenomenon of implosion to manifest itself. The pressure in combustion chamber 10 at the assumed point of measurement rises during and after closure of the exhaust orifices, the pressure reaching a value above that of the pressure at the source of supply (represented by line 34) by virtue of the self-compression of the fresh gases effected by the momentum thereof within the combustion chamber. The degree of supercharging is indicated by curve 37 at point 41, that is, at the instant AC, when complete closure of the inlet orifice has been effected. Thus, by proper operation, the pressure of a fresh charge in chamber 10 may, for example, be as much as two to seven or more pounds above the supply pressure, which is, in this case, atmospheric pressure.

The mean pressure of the inert gases in receiver 25 is indicated by the line 42. This means pressure is determined by the resistance offered to the discharge of the gases through turbine 27 or other similar device, and may accordingly be controlled by the construction and design of the turbine. In any given installation, the maximum mean static pressure of the stored gases is limited by the fact that too great a pressure in conduit 18 will hamper the proper manifestation of the phenomenon of explosive exhaust and implosive inlet. The greater the gaseous pressure in conduit 18, the greater will be the density and, consequently, the mass of the inert gases therein and, hence, the greater will be the resistance offered by the mass of inert gases per unit of length of travel of the exhaust gas mass to the acceleration and the outward movement of the exhaust gas mass projected from the combustion chamber by the explosive exhaust. If this resistance becomes too great, the exhaust gases will form the rebounding front closer to chamber 10 and will rebound into the chamber in so short a time that it may not be possible to close exhaust ports 17 before the gases enter the chamber. This will reduce the effectiveness of the implosive inlet. Accordingly, the pressure of the inert stored gases should be consistent with the operating characteristics of the combustion chamber for most efficient operation.

The modified power plant installation illustrated in Fig. 2 is generally similar to the above-described embodiment and similar or like parts in both embodiments are designated by the same reference numerals which have been primed. In lieu of the inlet pipe 12 of the first embodiment, the power plant shown in Fig. 2 includes a blower 44, which draws air from the atmosphere and discharges it at increased pressure into an air receiver 45, which in turn communicates with inlet ports 11' through an air conduit 46. Although a specific type of two-stage blower 44 is illustrated, by way of example, it will be clear that any of other suitable types of blowers may be used. Preferably, the blower is connected to be driven by shaft 32' of turbine 27', but any suitable source of power may be employed. If the turbine shaft is directly connected with the blower in the manner shown, the blower should be designed to operate efficiently at the working speed of the turbine. In order to obtain best results and maximum supercharging of chamber 10' in a given installation, the air receiver 45 and air conduit 46 should be constructed in accordance with the teaching of my Patent No. 2,281,585.

By virtue of the increased pressure of the air at the source of supply, that is, in air receiver 45, the pressure and mass of the fresh gases trapped in chamber 10' upon each closure of the inlet orifices will be correspondingly increased. This increased mass of fresh gas will support the burning of a greater charge of the combustible medium and the burning of this increased charge at the increased pressure thereof will result in a greater amount of energy in the burned gases. Accordingly, these gases will possess increased dynamic energy during the explosive exhaust thereof and, hence, will possess the ability to overcome greater resistance offered by the mass of inert gases accelerated in exhaust gas conduit 18' and receiver 25' and to increase the pressure of the inert gases. Thus, when the air at the source of supply is under pressure greater than atmospheric pressure, the mean pressure of the gases stored in receiver 25' and conduit 18' may be correspondingly increased without affecting the functioning of the combustion chamber in accordance with the phenomena of explosive exhaust and implosive inlet, as above explained.

Since the mean pressure of the stored or trapped exhaust gases, i. e., the inert gases, is dependent upon the resistance offered by the turbine or other device to the escape of the gases from receiver 25 or other equivalent enclosed space to the atmosphere, it is desirable to design the turbine in such a manner, that the mean pressure of the gases will approach the highest pressure which will not hamper the desired operation of the combustion chamber. By thus producing and maintaining a higher pressure in exhaust gas receiver 25, a greater amount of beneficial work may be realized from the power plant and with greater efficiency. An increase in the pressure of the stored gases will increase the gradient of expansion through the turbine or other similar device and, hence, increase the output thereof.

The construction and design, including the size, shape, and arrangement of the combustion chamber, its inlet and exhaust ports, the control means for said ports, the exhaust gas conduit 18', and the exhaust gas receiver 25' in the embodiment of Fig. 2 should be in accordance with the requirements discussed above in connection with the first embodiment, due regard being had for the increased pressures of the gases and the resultant increased energy available. The operation of both embodiments is exactly the same with respect to the explosive exhaust and implosive inlet phenomena and with respect to the self-cleaning and supercharging of the combustion chamber. The supercharging effect will, of course, be increased with an increase in the pressure of the air at the source of supply thereof.

As pointed out above, the base or relative zero pressure line 34 of the graph of Fig. 3 as applied to the embodiment of Fig. 1 represents atmospheric pressure. Similar curves are applicable to the embodiment of Fig. 2 but in the latter case, line 34 will represent the pressure of the gases in air receiver 45, that is, the relative zero pressure for the entire power plant installation and the peak pressures throughout the system will be increased by the increase of pressure at the source of supply of the fresh charge. Thus, the graph shown may be taken as representative for both of the illustrated embodiments.

It will be obvious that a plurality of combustion chambers may be connected to a common exhaust gas receiver through a common exhaust gas conduit or through separate conduits. Likewise, a common inlet air receiver may be used for supplying fresh gaseous charges to a plurality of combustion chambers through one or a plurality of inlet gas conduits. When a common exhaust gas conduit is used with a plurality of combustion chambers, it is necessary to time the operations of the chambers so that the exhaust orifice of only one chamber will be open at any time. Suitable arrangements for the purpose are disclosed in certain of the U. S. patents above identified. It will also be clear that a single exhaust gas receiver 25 may be utilized for servicing a plurality of turbines or other devices which are capable of operation by the energy possessed by a gaseous medium trapped under pressure in the receiver.

Although only a limited number of embodiments of the invention are diagrammatically illustrated and described, it is to be expressly understood that the scope of the invention is not limited thereto. For example, it may be necessary in most practical installations to employ a curved exhaust gas conduit in lieu of the straight conduit illustrated and this is unobjectionable so long as no surface is interposed in the path of the outwardly moving gases, from which they will rebound at an instant earlier than they would rebound from the pressure front created upon loss of their dynamic energy. Various other changes may also be made, particularly, in the design and arrangement of parts illustrated as well as in the specific construction of the various elements of the combination without departing from the spirit and scope of the invention.

For a definition of the limits of the invention, reference is had primarily to the appended claims wherein the terms "orifice" and "port" are intended to refer to either one or more orifices or ports.

This application is related to my co-pending application Serial No. 588,188 filed April 13, 1945.

The claims are:

1. In a power plant comprising a combustion chamber, in which charges of combustible mixture are successively burned, the chamber having inlet and exhaust orifices, the exhaust orifice being of sufficient size to permit explosive exhaust, and valves for controlling the orifices, the combination of means for operating the valves in the following order, (1) to close the chamber during ignition of each charge, (2) to open the exhaust orifice, after burning of the charge commences, in such manner as to produce explosive exhaust of the gases as a mass from the chamber, (3) to open the inlet orifice to admit a fresh gaseous charge into the chamber, and (4) to close the orifices to exclude exhaust gases that have left the chamber and to confine the fresh charge, and means for holding under pressure gases discharged from the chamber, said means including an elongated conduit leading at one end from the exhaust orifice and providing a free passage for exhaust gas masses and a receiver connected directly to the other end of the conduit, the conduit having a cross-sectional area adjacent the exhaust orifice substantially equal to the area of the exhaust orifice open at the moment that the burned gases cease reacting against the walls of the combustion chamber and start to move out of and away from the chamber as a mass, the conduit having a length such that its volume ranges from at least six times that of the combustion chamber to approximately the maximum volume of inert gases displaceable by such an exhaust gas mass, whereby each exhaust gas mass entering the conduit displaces the gases therein and a static rebounding pressure front develops in the holding means at a distance from the exhaust orifice, and a turbine connected to the receiver at a place more remote from the exhaust orifice than the place where the rebounding pressure front develops, the turbine being driven by gases from the receiver.

2. In a power plant comprising a combustion chamber, in which charges of combustible mixture are successively burned, the chamber having inlet and exhaust orifices of sufficient size to permit implosive inlet and explosive exhaust, respectively, and valves for controlling the orifices, the combination of means for operating the valves in the following order, (1) to close the chamber during ignition of each charge, (2) to open the exhaust orifice, after burning of the charge commences, in such manner as to produce explosive exhaust of the gases as a mass from the chamber, (3) to open the inlet orifice in such manner as to produce implosive inlet of a fresh gaseous charge into the chamber, and (4) to close the orifices to exclude exhaust gases which left the chamber and to confine the fresh charge, and means for holding under pressure gases discharged from the chamber, said means including an elongated conduit leading at one end from the exhaust orifice and providing a free passage for exhaust gas masses and a receiver connected directly to the other end of the conduit, the conduit having a cross-sectional area adjacent the exhaust orifice substantially equal to the area of the exhaust orifice open at the moment that the burned gases cease reacting against the walls of the combustion chamber and start to move out of and away from the chamber as a mass, the conduit having a length such that its volume ranges from at least six times that of the combustion chamber to approximately the maximum volume of inert gases displaceable by such an exhaust gas mass, whereby each exhaust gas mass entering the conduit displaces the gases therein and a static rebounding pressure front develops in the holding means at a distance from the exhaust orifice, and a turbine connected to the receiver at a place more remote from the exhaust orifice than the place where the rebounding pressure front develops, the turbine being driven by gases from the receiver.

3. In a power plant comprising a combustion chamber, in which charges of combustible mixture are successively burned, the chamber having inlet and exhaust orifices, the exhaust orifice being of sufficient size to permit explosive exhaust, valves for controlling the orifices, the combination of means for operating the valves in the following order, (1) to close the chamber during ignition of each charge, (2) to open the exhaust orifice, after burning of the charge commences, in such manner as to produce explosive exhaust of the gases as a mass from the chamber, (3) to open the inlet orifice for admission of fresh air into the chamber, a portion of the air passing through the exhaust orifice, and (4) to close the orifices to exclude the exhaust gases that have left the chamber and said portion of the air and to confine the charge of fresh air within the chamber, means for introducing fuel into the chamber to produce a combustible charge with air therein, means for igniting the charge, means for holding under pressure gases discharged from the chamber, said means including an elongated conduit leading from the exhaust orifice and receiving each exhaust gas mass and each of said portions of the air and a receiver connected to the conduit and having an outlet remote from its connection to the conduit, the conduit having a cross-sectional area adjacent the exhaust orifice substantially equal to the area of the exhaust orifice open at the moment that the burned gases cease reacting against the walls of the chamber and start to move out of and away from the chamber as a mass, the conduit providing a free passage for exhaust gas masses and having a length such that its volume ranges from at least six times that of the combustion chamber to approximately the maximum volume of inert gases displaceable by such an exhaust gas mass, whereby each exhaust gas mass entering the conduit displaces the gases therein and a static rebounding pressure front develops in the holding means at a distance from the exhaust orifice, and an expansion turbine connected to the receiver outlet.

4. In a power plant comprising a combustion chamber, in which charges of combustible mixture are successively burned, the chamber having inlet and exhaust orifices, the inlet and exhaust orifices being of sufficient size, respectively, to permit implosive inlet and explosive exhaust, and valves for controlling the orifices, the combination of means for operating the valves in the following order, (1) to close the chamber during ignition of each charge, (2) to open the exhaust orifice, after burning of the charge commences, in such manner as to produce explosive exhaust of the gases as a mass from the chamber, (3) to open the inlet orifice in such manner as to admit fresh air implosively into the chamber, a portion of the air passing out of the chamber through the exhaust orifice, and (4) to close the orifices to exclude the exhaust gases that have left the chamber and said portion of the air and to confine the charge of fresh air in the chamber, means for introducing fuel into the chamber to produce a combustible charge with air therein, means for igniting the charge, means for holding under pressure gases discharged from the chamber, said means including an elongated conduit leading from the exhaust orifice and receiving each exhaust gas mass and said portion of the fresh air and a receiver connected to the conduit and having an outlet remote from its connection to the conduit, the conduit having a cross-sectional area adjacent the exhaust orifice substantially equal to the area of the exhaust orifice open at the moment that the burned gases cease reacting against the walls of the chamber and start to move out of and away from the chamber as a mass, the conduit providing a free passage for exhaust gas masses and having a length such that its volume ranges from at least six times that of the combustion chamber to approximately the maximum volume of inert gases displaceable by such an exhaust gas mass, whereby each exhaust gas mass entering the conduit displaces the gases therein and a static rebounding pressure front develops in the holding means at a distance from the exhaust orifice, and an expansion turbine connected to the receiver outlet.

5. In a power plant comprising a combustion chamber, in which charges of combustible mixture are successively burned, the chamber having inlet and exhaust orifices, the exhaust orifice being of sufficient size to permit explosive exhaust, and valves for controlling the orifices, the combination of means for positively operating the valves in the following order, (1) to open the exhaust orifice, after burning of each charge commences, in such manner as to produce explosive exhaust of the burned gases as a mass from the chamber, (2) to open the inlet orifice to admit a fresh gaseous charge into the chamber, and (3) to close the orifices to confine the fresh charge within the chamber during ignition thereof, means for holding under pressure the gases discharged from the chamber, said means including a conduit having one end leading from the exhaust orifice, and a receiver connected directly to the other end of the conduit and of greater volume and cross-sectional area than the conduit, the conduit having a cross-sectional area at its connection to the exhaust orifice substantially equal to the area of the exhaust orifice opened at the moment that the burned gases cease reacting against the wall of the combustion chamber and start to move out of and away from the chamber as a mass in explosive exhaust, the conduit providing free passage for said exhaust gas masses and having such a length that it contains slightly less than the maximum volume of inert gases displaceable by such an exhaust gas mass, whereby such an exhaust gas mass traveling through the conduit causes a static pressure front to develop in the gases in the holding means at such distance from the exhaust orifice as to permit the valve operating means to close the exhaust orifice by its valve before gases returning through the conduit from the pressure front can enter the chamber through said orifice, an outlet from the receiver lying farther from the exhaust orifice than the place where the static pressure front develops, and a turbine having its inlet connected to the receiver outlet and driven by gases from the receiver.

6. In a power plant comprising a combustion chamber, in which charges of combustible mixture are successively burned, the chamber having inlet and exhaust orifices of sufficient size, respectively, to permit implosive inlet and explosive exhaust, and valves for controlling the orifices, the combination of means for positively operating the valves in the following order, (1) to open the exhaust orifice, after burning of each charge commences, in such manner as to produce explosive exhaust of the burned gases as a mass from the chamber, (2) to open the inlet orifice in such manner as to admit a fresh gaseous charge implosively into the chamber, and (3) to close the orifices to confine the fresh charge within the chamber during ignition thereof, means for holding under pressure the gases discharged from the chamber, said means including a conduit having one end leading from the exhaust orifice, and a receiver connected directly to the other end of the conduit and of greater volume and cross-sectional area than the conduit, the conduit having a cross-sectional area at its connection to the exhaust orifice substantially equal to the area of the exhaust orifice opened at the moment that the burned gases cease reacting against the wall of the combustion chamber and start to move out of and away from the chamber as a mass in explosive exhaust, the conduit providing a free passage for said exhaust gas masses and having such a length that it contains slightly less than the maximum volume of inert gases displaceable by such an exhaust gas mass, whereby such an exhaust gas mass traveling through the conduit causes a static pressure front to develop in the gases in the holding means at such distance from the exhaust orifice as to permit the valve operating means to close the exhaust orifice by its valve before gases returning through the conduit from the pressure front can enter the chamber through said orifice, an outlet from the receiver lying farther from the exhaust orifice than the place where the static pressure front develops, and a turbine having its inlet connected to the receiver outlet and driven by gases from the receiver.

7. In a power plant comprising a combustion chamber, in which charges of combustible mixture are successively burned, the chamber having inlet and exhaust orifices, the exhaust orifice being of sufficient size to permit explosive exhaust, and valves for controlling the orifices, the combination of means for positively operating the valves in the following order, (1) to open the exhaust orifice, after burning of each charge commences, in such manner as to produce explosive exhaust of the burned gases as a mass from the chamber, (2) to open the inlet orifice for admission of fresh air into the chamber, while the exhaust orifice is open, a portion of the air passing through the exhaust orifice, and (3) to close the orifices to confine the charge of fresh air within the chamber, means for introducing fuel into the chamber to produce a combustible mixture with the air therein, means for igniting the combustible mixture, means for holding under pressure the gases discharged from the chamber through the exhaust orifice, said means including a conduit having one end leading from the exhaust orifice and a receiver connected directly to the other end of the conduit and of greater volume and cross-sectional area than the conduit, the conduit having a cross-sectional area at its connection to the exhaust orifice substantially equal to the area of the exhaust orifice opened at the moment that the burned gases cease reacting against the wall of the combustion chamber and start to move out of and away from the chamber as a mass in explosive exhaust, the conduit affording a free passabe for exhaust gas masses and having such a length that it contains slightly less than the maximum volume of inert gases displaceable by such an exhaust gas mass, whereby such an exhaust gas mass traveling through the conduit causes a static pressure front to develop in the gases in the holding means at such distance from the exhaust orifice as to permit the valve operating means to close the exhaust orifice by its valve before gases returning through the conduit from the pressure front can enter the chamber through said orifice, an outlet from the receiver lying farther from the exhaust orifice than the place where the static pressure front develops, and a turbine having its inlet connected to the receiver outlet and driven by gases from the receiver.

8. In a power plant comprising a combustion chamber, in which charges of combustible mixture are successively burned, the chamber having inlet and exhaust orifices of sufficient size, respectively, to permit implosive inlet and explosive exhaust, and valves for controlling the orifices, the combination of means for positively operating the valves in the following order, (1) to open the exhaust orifice, after burning of each charge commences, in such manner as to produce explosive exhaust of the burned gases as a mass from the chamber, (2) to open the inlet orifice, while the exhaust orifice is open, to admit a charge of fresh air implosively into the chamber, a portion of the air passing through the exhaust orifice, and (3) to close the orifices to confine the charge of fresh air within the chamber, means for introducing fuel into the chamber to produce a combustible mixture with the air therein, means for igniting the combustible mixture, means for holding under pressure the gases discharged from the chamber through the exhaust orifice, said means including a conduit having one end leading from the exhaust orifice and a receiver connected directly to the other end of the conduit and of greater volume and cross-sectional area than the conduit, the conduit having a cross-sectional area at its connection to the exhaust orifice substantially equal to the area of the exhaust orifice opened at the moment that the burned gases cease reacting against the wall of the combustion chamber and start to move out of and away from the chamber as a mass in explosive exhaust, the conduit affording a free passage for exhaust gas masses and having such a length that it contains slightly less than the maximum volume of inert gases displaceable by such an exhaust gas mass, whereby such an exhaust gas mass traveling through the conduit causes a static pressure front to develop in the gases in the holding means at such distance from the exhaust orifice as to permit the valve operating means to close the exhaust orifice by its valve before gases returning through the conduit from the pressure front can enter the chamber through said orifice, an outlet from the receiver lying farther from the exhaust orifice than the place where the static pressure front develops, and a turbine having its inlet connected to the receiver outlet and driven by gases from the receiver.

MICHEL KADENACY.

REFERENCES CITED

The following references are of record in the file of this patent:

UNITED STATES PATENTS

| Number | Name | Date |
|---|---|---|
| 1,593,571 | Curtis | July 27, 1926 |
| 2,102,559 | Kadenacy | Dec. 14, 1937 |
| 2,113,480 | Kadenacy | Apr. 5, 1938 |
| 2,123,569 | Kadenacy | July 12, 1938 |
| 2,134,285 | Kipfer | Oct. 25, 1938 |
| 2,281,585 | Kadenacy | May 5, 1942 |

FOREIGN PATENTS

| Number | Country | Date |
|---|---|---|
| 176,838 | Great Britain | Mar. 6, 1922 |
| 308,595 | Great Britain | Aug. 18, 1930 |
| 424,955 | Great Britain | Dec. 1, 1933 |
| 626,976 | France | May 28, 1927 |